(12) United States Patent
Yan et al.

(10) Patent No.: US 10,619,086 B2
(45) Date of Patent: Apr. 14, 2020

(54) NANOPARTICLE CARRIER PLATFORM AND METHODS FOR CONTROLLED RELEASE OF SUBTERRANEAN WELL TREATMENT ADDITIVES

(71) Applicant: Tomson Technologies, Houston, TX (US)

(72) Inventors: Chao Yan, Sugar Land, TX (US); Ross Tomson, Houston, TX (US); Paula Guraieb, Houston, TX (US); Nasser Ghorbani, The Woodlands, TX (US)

(73) Assignee: TOMSON TECHNOLOGIES, Houston, TX (US)

( * ) Notice: Subject to any disclaimer, the term of this patent is extended or adjusted under 35 U.S.C. 154(b) by 74 days.

(21) Appl. No.: 15/897,250

(22) Filed: Feb. 15, 2018

(65) Prior Publication Data

US 2018/0171211 A1    Jun. 21, 2018

Related U.S. Application Data

(62) Division of application No. 15/593,603, filed on May 12, 2017, now Pat. No. 9,926,485.
(Continued)

(51) Int. Cl.
*C09K 8/536* (2006.01)
*C09K 8/03* (2006.01)
(Continued)

(52) U.S. Cl.
CPC ............ *C09K 8/536* (2013.01); *B01J 20/08* (2013.01); *B01J 20/28004* (2013.01);
(Continued)

(58) Field of Classification Search
None
See application file for complete search history.

(56) References Cited

U.S. PATENT DOCUMENTS

| 5,089,150 A | 2/1992 | Hen |
| 5,964,291 A | 10/1999 | Bourne et al. |

(Continued)

FOREIGN PATENT DOCUMENTS

| WO | WO 2008/030758 | 3/2008 |
| WO | WO 2010/081480 | 7/2010 |

(Continued)

OTHER PUBLICATIONS

Haghtalab et al. "Evaluation of the Effective Parameters in Synthesis of the Nano-Structured Scaling Inhibitors Applicable in Oil Fields with Sea Water Injection Process", Journal of Nanoparticle Research, 14, (2012), pp. 1210-1221.

(Continued)

*Primary Examiner* — John J Figueroa
(74) *Attorney, Agent, or Firm* — Norton Rose Fulbright US LLP

(57) ABSTRACT

Nano-sized mixed metal oxide carriers capable of delivering a well treatment additive for a sustained or extended period of time in the environment of use, methods of making the nanoparticles, and uses thereof are described herein. The nanoparticles can have a formula of:

$$A/[M_x^1 M_y^2 M_z^3]O_n H_m$$

where x is 0.03 to 3, y is 0.01 to 0.4, z is 0.01 to 0.4 and n and m are determined by the oxidation states of the other elements, and $M^1$ can be aluminum (Al), gallium (Ga), indium (In), or thallium (Tl). $M^2$ and $M^3$ are not the same and can be a Column 2 metal, Column 14 metal, or a transition metal. A is can be a treatment additive.

20 Claims, 9 Drawing Sheets

Related U.S. Application Data

(60) Provisional application No. 62/345,568, filed on Jun. 3, 2016.

(51) Int. Cl.
| | |
|---|---|
| *C09K 8/58* | (2006.01) |
| *B01J 20/08* | (2006.01) |
| *B01J 20/28* | (2006.01) |
| *B01J 20/30* | (2006.01) |
| *C09K 8/524* | (2006.01) |
| *C09K 8/50* | (2006.01) |
| *C09K 8/528* | (2006.01) |

(52) U.S. Cl.
CPC ... *B01J 20/28007* (2013.01); *B01J 20/28016* (2013.01); *B01J 20/3085* (2013.01); *C09K 8/03* (2013.01); *C09K 8/58* (2013.01); C09K 8/50 (2013.01); C09K 8/524 (2013.01); C09K 8/528 (2013.01); C09K 2208/10 (2013.01); C09K 2208/20 (2013.01); C09K 2208/22 (2013.01); C09K 2208/26 (2013.01); C09K 2208/28 (2013.01); C09K 2208/32 (2013.01)

(56) References Cited

U.S. PATENT DOCUMENTS

| | | | |
|---|---|---|---|
| 6,693,071 | B2 | 2/2004 | Ghosh et al. |
| 7,422,759 | B2 | 9/2008 | Kepner et al. |
| 7,491,682 | B2 | 2/2009 | Gupta et al. |
| 7,493,955 | B2 | 2/2009 | Gupta et al. |
| 8,822,386 | B2 | 9/2014 | Quintero et al. |
| 2002/0127164 | A1* | 9/2002 | Liu ................. B01J 29/041 423/306 |
| 2004/0023824 | A1 | 2/2004 | Züechner et al. |
| 2008/0138538 | A1 | 6/2008 | Lewis et al. |
| 2009/0312201 | A1 | 12/2009 | Huang et al. |
| 2010/0314108 | A1 | 12/2010 | Crews et al. |
| 2012/0015852 | A1* | 1/2012 | Quintero ............. C09K 8/032 507/112 |
| 2013/0341028 | A1 | 12/2013 | Christin et al. |
| 2014/0338915 | A1 | 11/2014 | Ferm et al. |
| 2015/0027699 | A1 | 1/2015 | Loiseau et al. |
| 2017/0174978 | A1* | 6/2017 | Giro ................. E21B 43/16 |

FOREIGN PATENT DOCUMENTS

| | | |
|---|---|---|
| WO | WO 2012/009128 | 1/2012 |
| WO | WO 2012/148819 | 11/2012 |
| WO | WO 2012/154332 | 11/2012 |

OTHER PUBLICATIONS

Kiaei et al., "Desalination 2014, 338, 84-92 Experimental Study of Using Ca-DTPMP Nanoparticles in Inhibition of CaCO3 Scaling in a Bulk Water Process", Desalination, 338, (2014), pp. 84-92.

Shen et al., "Control Placement of Scale Inhibitors in the Formation With Stable Ca-DTPMP Nanoparticle Suspension and Its Transport In Porous Medium", Society of Petroleum Engineers, (2008).

Watanabe et al. "Synthesis of Nano-sized Boehmites for Optimum Phosphate Sorption", Separation Science and Technology, 46.5, (2011), pp. 818-824.

Yan et al., "Boehmite Based Sulphonated Polymer Nanoparticles with Improved Squeeze Performance for Deepwater Scale Control", Offshore Technology Conference, (2013).

Yan et al., "Synthesis and Sorption Study of AlOOH Nanoparticle-Crosslinked Polymeric Scale Inhibitors and Their Improved Squeeze Performance in Porous Media", Offshore Technology Conference, (2013).

Yan, et al., "Synthesis and Size Control of Monodispersed Al-sulphonated Polycarboxylic Acid (Al-SPCA) Nanoparticles with Improved Squeeze Performance and Their Transport in Porous Media", Society of Petroleum Engineers, (2012).

Zhang et al., "Enhanced transport of novel crystalline calcium-phosphonate scale inhibitor nanomaterials and their long term flow back performance in laboratory squeeze simulation tests", RSC Advances, 6, (2016), pp. 5259-5269.

Zhang et al., "Silica-Templated Synthesis of Novel Zinc-DTPMP Nanomaterials: Their Transport in Carbonate and Sandstone Media During Scale Inhibition", Society of Petroleum Engineers, 19:3, (2011).

Zhang et al., "Surfactant-Assisted Synthesis of Metal-Phosphonate Inhibitor Nanoparticles and Transport in Porous Media", Society of Petroleum Engineers, 15:3, (2010).

Zhang et al., "Synthesis of Crystalline-Phase Silica-Based Calcium Phosphonate Nanomaterials and Their Transport in Carbonate and Sandstone Porous Media", Ind. Eng. Chem. Res., 50:4, (2011), pp. 1819-1830.

\* cited by examiner

NANOPARTICLE CARRIER PLATFORM AND METHODS FOR CONTROLLED RELEASE OF SUBTERRANEAN WELL TREATMENT ADDITIVES

CROSS REFERENCE TO RELATED APPLICATIONS

This application is a divisional application of U.S. patent application Ser. No. 15/593,603, filed May 12, 2017, and claims benefit to U.S. Provisional Application No. 62/345,568, filed Jun. 3, 2016, all of which are incorporated herein by reference in their entirety and without disclaimer.

BACKGROUND OF THE INVENTION

A. Field of the Invention

The invention generally concerns nanoparticle carrier platforms to controllably release well treatment additives (e.g., scale inhibitors) to subterranean gas, oil, or water wells, or subterranean formations. The nanoparticles can be made of a mixed metal oxide formed as a crystal lattice structure. Subterranean well treatment additives can be loaded onto the surface or impregnated within the nanoparticles.

B. Description of Related Art

Chemical carrier platforms can be used in the subterranean drilling industry to deliver subterranean well treatment additives. By way of example, scale inhibitors can be injected into the subterranean well to try to extend the time period over which such additives are released. Controlled or extended release of additives from the carrier platforms is desirable in order to avoid or eliminate retreatment of the well, as retreatment is costly and time consuming.

There are also safety and environmental risks involved with each treatment. In particular, scale inhibitors used to prevent or to control scale depositions in subterranean wells can be delivered by a process known as a "squeeze treatment". In scale-inhibitor squeeze, the inhibitor can be attached to the formation matrix by chemical adsorption or by temperature-activated precipitation and returns with the produced fluid at sufficiently high concentrations to avoid scale precipitation. Scale inhibitor chemicals can be continuously injected through a downhole injection point in the completion, or periodic squeeze treatments can be undertaken to place the inhibitor in the reservoir matrix for subsequent commingling with produced fluids. Some scale inhibitor systems integrate scale inhibitors and fracture treatments into one step. In this type of treatment, a scale inhibitor can be pumped into the formation, adsorbs to the matrix during pumping and then release when the fracture begins to produce water. As the water passes through the inhibitor-adsorbed zone, it dissolves the inhibitor to prevent scale nucleation and deposition of salts in the well. A commercially available scale inhibitor system is sold under the name Scaleguard® (from Carbo Ceramics, Inc., Houston, Tex.). This system includes a porous ceramic proppant impregnated with a scale inhibitor which releases the scale inhibitor upon contact with water for slow release in fractured wells via a semipermeable coating.

Various scale inhibitors systems have been investigated to improve the delivery of additives to a hydrocarbon producing well. By way of example, Shen et al. (*SPE International Oilfield Scale Conference*. Society of Petroleum Engineers, 2008) describes calcium-diethylenetriamine penta(methylenephosphonate)(Ca-DTPMP) nanoparticle suspensions for the controlled placement of scale inhibitors in a formation and transport of the scale inhibitors in a porous medium. Boehmite based sulfonated polymer nanoparticles have been described by Yan et al. (*Offshore Technology Conference*. Offshore Technology Conference, 2013), while the production of nano-sized boehmites for phosphate sorption has been described by Wantanbe et al. (*Separation Science and Technology* 46.5 (2011): 818-824).

Other attempts to improve release of scale inhibitors into a well include crosslinking polymeric scale inhibitors with aluminum oxide hydroxide (AlO(OH)) or α-aluminum oxide hydroxide (α-AlO(OH)) (See, for example, Yan et al. *SPE International Symposium on Oilfield Chemistry, Society of Petroleum Engineers*, 2013 and Yan et al. *SPE Journal* 19.04 (2014): 687-694). Zhang et al. describes crystalline phase calcium-phosphonate scale inhibitor nanomaterials prepared from amorphous silica templated calcium-phosphonate precipitates (*RSC ADV.* 2016, 6, 5259-5269 and *Ind. Eng. Chem. Res.* 2011, 50(4), pp. 1819-1830).

Still further, other additives have been combined with scale inhibitors for well treatment. By way of example, antimicrobial compositions in combination with scale inhibitors made from various possible combinations of metal oxides is described in U.S. Pat. No. 7,422,759 to Kepner et al.

Despite the foregoing, the above mentioned nanoparticle carriers suffer from inadequate controlled release of the subterranean treatment additives over an extended period of time from the currently available carrier platforms, leading to the need for retreatments, increased environmental risks, and economic losses.

SUMMARY OF THE INVENTION

A discovery has been made that solves the problems associated with treating subterranean formations (e.g., reservoirs) or wells (e.g., oil, gas and water wells) with well treatment additives (e.g., scale inhibitors). The solution resides in the development of a mixed metal oxide nanoparticle, preferably a ternary mixed metal oxide nanoparticle that is loaded with a well treatment additive. The nanoparticle can have a general structure of $A/[M^1_xM^2_yM^3_z]O_nH_m$ where $M^1$, $M^2$, and $M^3$ are in the crystal lattice structure of the nanoparticle, and A is the well treatment additive that can be slowly released from the nanoparticle. Surprisingly, this structural set-up allows for a slow release profile of the additive, such that the additive can be released from the nanoparticle over an extended period of time (e.g., at least for 10 days to 10 years or more, 500 days, at least for 1000 days, at least for 2000 days, at least for 500 days to 2500 days, or at least for 500 days to 2000 days after well treatment) during use. The time the nanoparticle continues to return meaningful concentrations of inhibitor can vary depending on the water production rate of the well. This, in turn, reduces the costs, expenses, and overall inefficiencies with having to perform continuous or more periodic well treatments such as with the processes currently used in the well-treatment industry. Without wishing to be bound by theory, it is believed that by having the metals of the mixed metal oxide nanoparticle present in the crystal lattice, more efficient loading (e.g., adsorption or chemical bonding) of the well treatment additive into the crystal lattice can take place. Such loading can provide for a more controllable or slower dissolution or desorption of the additive into an aqueous environment and inhibit leaching of the treatment additive from the nanoparticle, thereby providing the prolonged release profile of the additive during use.

In one aspect of the present invention, there is disclosed nanoparticles of general formula $A/[M^1_xM^2_yM^3_z]O_nH_m$, where A is the subterranean treatment additive (e.g., a scale inhibitor) and $[M^1_xM^2_yM^3_z]O_nH_m$ is a mixed metal oxide in the form of a crystal lattice structure, which includes various loadings of the three metals. The nanoparticle can include aluminum oxyhydroxide (AlOOH) or aluminum hydroxide (Al(OH)) phases. Subterranean treatment additive, and well treatment additive can be used interchangeably throughout the specification. $M^1$ can be a metal from Column 13 of the Periodic Table (e.g., aluminum (Al), gallium (Ga), indium (In) and titanium (Ti). $M^2$ and $M^3$ can each be a Column 2 metal, a Column 14 metal, or a transition metal of the Periodic Table. In a preferred instance, $M^2$ and $M^3$ are different from each other. The amount of oxygen present in the crystal lattice can be determined by the oxidation states of the metals such that a balanced electric charge (i.e. of zero) is achieved. Said another way, the crystal lattice structure formed by the three metals and the oxygen preferably maintains a neutral charge. It was surprisingly found, as described in one non-limiting embodiment in the Examples section, that such nanoparticles provide controlled release of the subterranean well treatment additive over an extended period of time, which can reduce or eliminate the need for reapplication of the additive, providing significant cost and labor savings. By way of example, the nanoparticles of the present invention provded scale inhibitor for 2000 days as compared to 215 days for a conventional scale inhibitor (e.g., sulfonated polycarboxylic acid (SPCA)). The nanoparticles can have a particle diameter of up to 10,000 nm, and are preferably in the 10-200 nm size range as determined by laser particle size analysis and transmission electron microscopy (TEM). The nanoparticle diameter can also range from, e.g., 1 to 1000 nm, from 5 to 700 nm, from 10 to 500 nm, from 50 to 300 nm, or any value or range from 1 nm up to 10,000 nm.

In preferred aspects, the present invention relates to nanoparticles that allow for extended release of subterranean well treatment additives, e.g., scale inhibitors. As discussed above and throughout the specification, the additive can be bound to the nanoparticle or otherwise adhered to the nanoparticle. The additive can be a scale inhibitor that is an organic molecule having a carboxylic acid, a polycarboxylic aspartic acid, maleic acid, sulfonic acid, phosphonic acid, or a phosphate ester group. In particularly preferred embodiments, the scale inhibitor can be a polymer that includes sulfonated polycarboxylic acid groups.

Also disclosed are methods of producing the nanoparticles. The method can include obtaining an aqueous solution of an alkoxide, and precipitating the nanoparticle having $M^1$, $M^2$ and $M^3$ in the crystal lattice of the nanoparticle. The subterranean well treatment additive can then loaded onto the nanoparticle. In a preferred aspect, the precipitation step can be performed by reducing the pH, or it can include removing the alkoxide from the aqueous solution, as well as, optionally, water. In preferred aspects, the solution can contain 0.01 to 9 wt. % $M^1$, from 0.01 to 1 wt. % $M^2$ and $M^3$.

Another aspect of this invention is a subterranean well treatment composition containing the nanoparticles of the present invention, and methods of treating the well with such composition by injecting it into a well or a subterranean formation (e.g., a reservoir or an uncased well). The composition may be added to other drilling fluids, e.g., saltwater or other aqueous fluids. The composition can include aqueous, nonaqueous medium, or mixtures thereof (e.g., salt water, an acidic aqueous solution, low sulfate seawater, an aqueous sodium carbonate solution, a surfactant, or other flush fluid, oil phase, suspension, non-aqueous delivery, or any combination thereof).

In some embodiments, a method of delivering an additive to a subterranean formation is disclosed. The method can include obtaining a composition that includes the additive loaded nanoparticles described above and throughout the specification and providing the additive loaded nanoparticle composition to a subterranean formation. The additive loaded nanoparticle composition can be provided to a drilling fluid (mud fluid) or an enhanced oil recovery fluid.

The following includes definitions of various terms and phrases used throughout this specification.

The term "capable of being released" as it relates to the subterranean well treatment additive means that, under conditions of use, e.g., in a subterranean well, the well treatment additive dissociates, hydrolyzes, is chemically unbound, or becomes otherwise separated from the nanoparticle and available for use for its intended purpose, e.g., a scale inhibitor in a subterranean well.

The term "controlled release over an extended period of time" relates to the release rate of the subterranean well treatment additive from the nanoparticles and means that the additive is, in an environment of use such as, e.g., a subterranean well, released from the nanoparticle over a longer period of time than if the additive were not adsorbed or otherwise affixed to the to the nanoparticle of the invention.

The terms "formation fluid" or "formation fluids" includes liquids and gases present in a formation. Non-limiting examples, of formation fluid include hydrocarbon liquids and gases, water, salt water, sulfur and/or nitrogen containing hydrocarbons, inorganic liquids and gases and the like.

The terms "about" or "approximately" are defined as being close to as understood by one of ordinary skill in the art. In non-limiting embodiment, the terms are defined to be within 10%, preferably within 5%, more preferably within 1%, and most preferably within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting close" or "reducing" or "preventing" or "avoiding" or any variation of these terms, when used in the claims and/or the specification includes any measurable decrease or complete inhibition to achieve a desired result. The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The nanoparticles and methods of the present invention can "comprise," "consists essentially of," or "consists of" particular elements, ingredients, components, compositions, etc. disclose throughout the specification. With respect to the transitional phrase "consisting essentially of," in one non-limiting aspect a basic and novel characteristic of the nanoparticles of the present invention are their ability to deliver a controllable release well treatment additive over an extended period of time during use (e.g., in subterranean wells).

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, on recited elements or method steps.

Other objects, features and advantages of the present invention will become apparent from the following figures, a detailed description, and examples. It should be understood, however, that the figures, detailed description, and examples, while indicating specific embodiments of the invention, are given by way of illustration only, and are not meant to be a limiting. Additionally, it is contemplated that changes and modifications within the spirit and scope of the invention will become apparent to those skilled in the art from this detailed description.

DETAILED DESCRIPTION OF THE INVENTION

Figure 1:
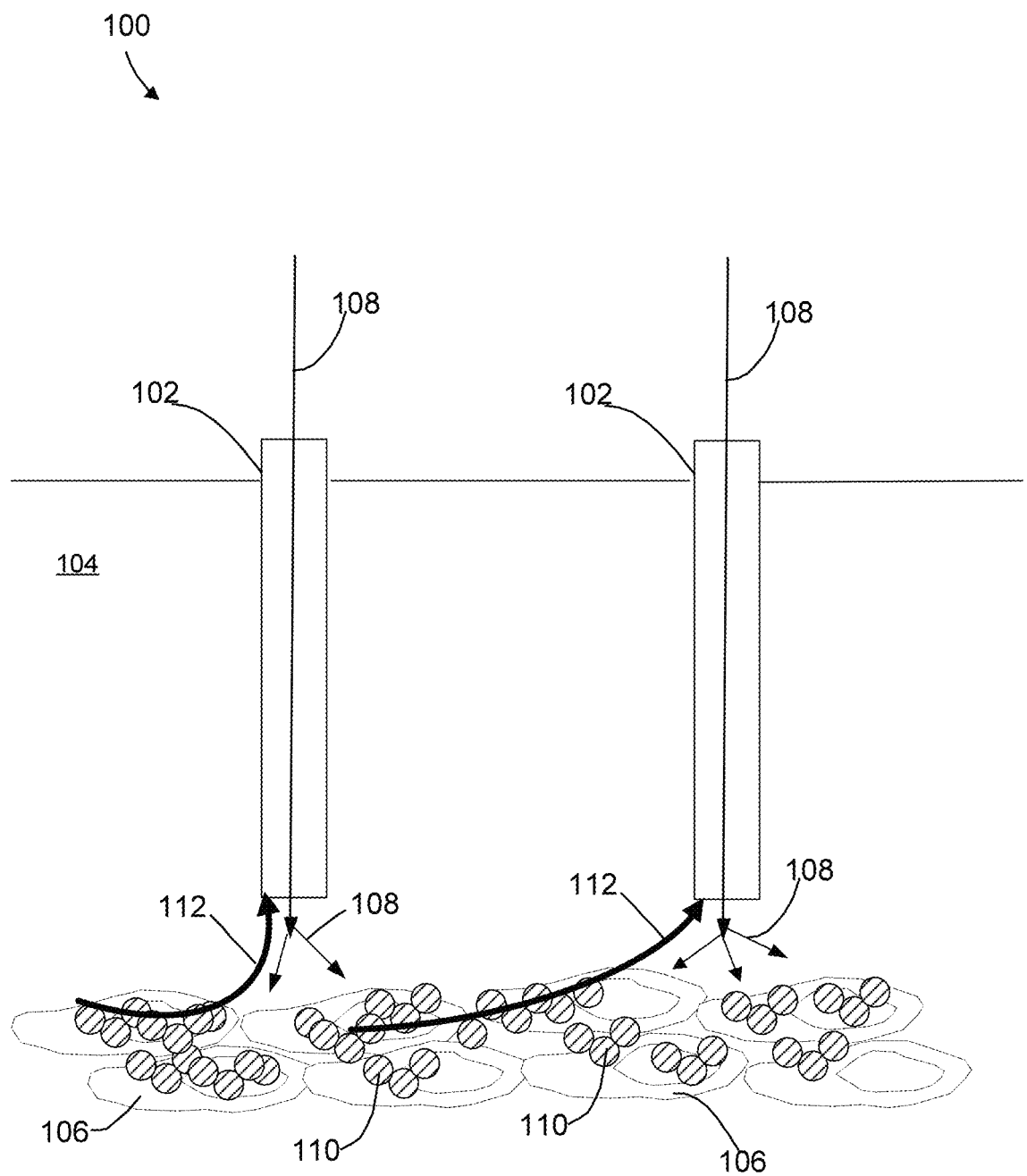
FIG. 1 is a schematic of a method to treat a subterranean well using the nanoparticles of the present invention loaded with a subterranean treatment additive.

A discovery has been made which provides nanoparticulate carriers for subterranean treatment additives (e.g., well treatment additives). These nanoparticulate carriers can provide extended or sustained release of a subterranean treatment additive in an environment of use, e.g., in a subterranean oil, gas well, water well, or any subterranean reservoir. Controlled release of such additives over an extended period of time decreases or eliminates the need to retreat wells or subterranean formations (e.g., hydrocarbon reservoirs) with such additives, providing a cost and labor savings, and less environmental risks. The discovery is premised on bonding or adsorbing the additive to nanoparticles of mixed metal oxides. These nanoparticulate carriers can be prepared by: (1) obtaining an aqueous solution that includes a metal ($M^1$) alkoxide, as well as a second and third metal salt or alkoxide ($M^2$ or $M^3$ salt or alkoxide); (2) precipitating from the aqueous solution a nanoparticle having $M^1$, $M^2$, and $M^3$ in the crystal lattice structure of the nanoparticle; and (3) loading the subterranean treatment additive (e.g., well additive) into the nanoparticle.

The invention provides an elegant way to provide a cost- and labor-effective methods to deliver subterranean treatment additives such as scale inhibitors to wells so that they release the additive over a long period of time, in a manner that reduces or eliminates the need to retreat wells with such additives. The invention also provides effective methods to deliver additives to fluids used to produce fluids (e.g., oil and gas) from subterranean formations. For example, delivery of additives to drilling fluid additives (mud additives), enhanced oil recovery (EOR) fluids, or the like.

These and other non-limiting aspects of the present invention are discussed in further detail in the following sections.

A. Nanoparticles with a Subterranean Treatment Additive

The subterranean treatment additive containing nanoparticle ("loaded nanoparticle") of the present invention is a mixed metal oxide nanoparticle having the subterranean treatment additive connected to the nanoparticle such that small, but effective, amounts of subterranean treatment additive are removed from the nanoparticle over a period of time. The loaded nanoparticles are discussed in further detail in the following sections.

1. Mixed Metal Oxide Nanoparticulate Carrier

The nanoparticles of the present invention can include a mixed metal oxide of three metals $M^1$ $M^2$ and $M^3$. These metals can form the crystal lattice of the mixed metal oxide. $M^1$ metals can include Column 13 element of the Periodic Table. Non-limiting examples of Column 13 metals include aluminum (Al), gallium (Ga), indium (In), and thallium (Tl). $M^2$ and $M^3$ metals can include a Column 2 metal, a Column 14 metal, or a transition metal of the Periodic Table. Non-limiting examples of Column 2 metals include beryllium (Be) magnesium (Mg), calcium (Ca), strontium (Sr), barium (Ba), or radium (Ra). Non-limiting examples of Column 14 metals include tin (Sn), lead (Pb), Germanium (Ge). Non-limiting examples of transition metals (Columns 3-12) include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), darmstadtium (Ds), roentgenium (Rg) and copernicum (Cn).

The nanoparticles of the present invention can have the general formula:

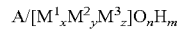

$$A/[M^1_xM^2_yM^3_z]O_nH_m$$

where A is a subterranean well treatment additive capable of being released from the nanoparticle, and $M^1$, $M^2$, and $M^3$ are in the crystal lattice structure of the nanoparticle. $M^1$ is a Column 13 element can be aluminum (Al), gallium (Ga), indium (In), thallium (Tl). $M^2$ and $M^3$ can be Column 2 metal, a Column 14 metal, or a transition metal, with the proviso that $M^2$ and $M^3$ are different. $M^2$ and $M^3$ can each independently be beryllium (Be), magnesium (Mg), calcium (Ca), strontium (Sr), barium (Ba) and radium (Ra), or combinations thereof. In a particular embodiment, Mg and Ca are particularly preferred, especially when $M^1$ is aluminum (Al). The molar amounts of each metal are designated by x, y, and z, with x ranging from 0.03 to 3, y ranging from 0.01 to 0.4, and z ranging from 0.01 to 0.4. The molar amount of oxygen is represented by n, and the molar amount of hydrogen is represented by m. The molar amount of oxygen is determined by the oxidation states of the metals $M^1$, $M^2$, and $M^3$ and the molar amount of hydrogen is determined by hydrolysis of metals $M^1$, $M^2$, and $M^3$ in the crystal lattice. According to the present invention, x can range from 0.03 to 3, 0.5 to 1, 2 to 3, or 0.03, 0.05, 0.1, 0.15, 1.0, 1.05, 1.1, 1.15, 2.0, 2.05, 2.1, 2.15, 3.0 or any value or range there between, y and z can range from 0 to 0.4, preferably from 0.1 to 0.3, and more preferably from 0.1 to 0.2, or 0.01, 0.05, 0.1, 0.15, 0.2, 0.25, 0.3, 0.35, 0.4 or any value or range there between, n can range from 1 to 10, more preferably from 2 to 8, and most preferably from 3 to 5, or 1, 2, 3, 4, 5, 6, 7, 8, 9, 10, or any value or range there between, and m can range from 1 to 5, more preferably from 1 to 4, and most preferably from 1 to 3, or 1, 2, 3, 4, 5, or any value or range there between. Without wishing to be bound by theory, it is believed that the amount of hydrogen can be related to the degree of hydrolysis. In a partially hydrolyzed crystal, which is the boehmite phase, the molar concentration of O is twice as much as hydrogen, thus n=2 m. In fully hydrolyzed crystal, which is the hydroxide phase, the molar concentration of O is equal to that of hydrogen, thus n=m. In some embodiments the a oxyhydroxide or hydroxide is not present and the nanoparticle has the general structure of $A/[M^1{}_xM^2{}_yM^3{}_z]O_n$, where x, y, z, and n are as defined above.

The nanoparticles can have an atomic ratio of metals ranging from about 1 to about 99. For example, in one aspect the atomic ratio of a $M^1/M^2/M^3$ can range from 20-80:20-60:20-80, or 40-75:25-60:25-60, preferably 90:5:5, 60:30:10, 60:25:15, 50:25:25, 50:30:20, 40:50:10 or any ratio there between. In another aspect, the atomic ratio of a Al/Mg/Ca nanoparticle can range from about 20-80:20-60:20-80, or 40-75:25-60:25-60, preferably about 60:30:10, about 60:25:15, about 50:25:25, about 50:30:20, about 40:50:10, and about 90:5:5 or any range there between. The ratio of oxygen to the metals will depend primarily on the oxidation state of the metals and can vary accordingly. The nanoparticles can include aluminum oxyhydroxides (α-AlOOH, β-AlOOH, or γ-AlOOH) or aluminum hydroxides phase (Al(OH)$_3$), either amorphous or crystallized phases.

The nanoparticles of the present invention have physical properties that can contribute to the controlled release of the subterranean well treatment additive over an extended period of time. The nanoparticles can have an average diameter of from 1 nm to 10,000 nm, preferably 10 nm to 200 nm in diameter, and more preferably from 15 to 175 nm, 2 to 12 nm or 5 nm to 10 nm, or 2 nm, 3 nm, 4 nm, 5 nm, 6 nm, 7 nm, 8 nm, 9 nm, 10 nm, 11 nm, 12 nm or any range or value there between as measured by laser particle size and TEM.

2. Subterranean Treatment Additive

Subterranean treatment additives are additives that can effect or inhibit performance of a material or fluid in a subterranean well, reservoir, or the like. The subterranean treatment additive can be separated from the nanoparticle in response to a stimuli (e.g., formation fluid, water, or pressure). The additive can be bound to the nanoparticle, e.g., chemically via an ionic bond, and/or be adhered to the nanoparticle. Non-limiting examples of the nanoparticle bonding to the additive include an ionic bond, a covalent bond, a hydrogen bond, a Van der Walls interaction. Adhesion to the nanoparticle can be through absorption or adsorption onto the particle.

Non-limiting examples of a subterranean treatment additive include a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foaming agent, a defoamer, an emulsifier, a demulsifier, an iron control agent, a solvent, a friction reducer, or any combination thereof. A scale inhibitor is a particularly preferred subterranean well treatment additive. The scale inhibitor can be an organic molecule (e.g., a polymer, oligomer, copolymer, and the like) having a functionalized group that can bind to the particle. Non-limiting examples of functionalized groups include a carboxylic acid, a polycarboxylic acid, aspartic acid, maleic acid, sulphonic acid, phosphonic acid, or a phosphate ester group or salts thereof. A particularly preferred scale inhibitor is a polymer containing sulfonated polycarboxylic acid groups (e.g., SPCA). A non-limiting example of a commercial source of SPCA is Nalco Champion an Ecolab company (USA) sold under the tradename EC6157A.

B. Methods of Making Nanoparticles

The nanoparticles of the present invention can be prepared by a co-precipitation method. The subterranean treatment additive can then be added to the nanoparticle using impregnation or coating methods. These methods are described in more detail below and in the Examples section. The co-precipitation method can include the steps of: obtaining an aqueous solution of an $M^1$ alkoxide, an $M^2$ salt or alkoxide, and an $M^3$ salt or alkoxide; and precipitating from the aqueous solution a nanoparticle having $M^1$, $M^2$, and $M^3$ in the crystal lattice structure of the nanoparticle.

In step one of the method, an aqueous solution of an $M^1$ alkoxide, an $M^2$ salt or alkoxide can be obtained. The aqueous solution can contain from 0.01 to 9 wt. % $M^1$, 0.1 to 7.5 wt. % $M^1$, 1.0 to 5 wt. % $M^1$, or 2 to 3 wt. % $M^1$, 0.01 to wt. % $M^2$, from 0.1 to 0.5 wt. % $M^2$, or from 0.25 to 0.3 wt. % $M^2$, and contains from 0.01 to 1 wt. % $M^3$, from 0.1 to 0.5 wt. % $M^3$, or from 0.25 to 0.3 wt. % $M^3$.

Non-limiting examples of alkoxides that can bond to $M^1$, $M^2$, and/or $M^3$ include methoxide, ethoxide, propoxide, isopropoxide, s-butoxide, i-propoxide, 2-ethylhexoxide, t-butoxide, hexafluoro-t-butoxide, tri-sec butoxide or combinations thereof. In particularly preferred aspects, $M^1$ alkoxide can be aluminum tri-sec-butoxide.

$M^2$ and $M^3$ metals can be provided in varying oxidation states as metallic, oxide, hydrate, or salt forms typically depending on the propensity of each metals stability, reactivity, and/or physical/chemical properties, and are preferably provided as water-soluble salts or alkoxides. The metals in the preparation of the nanoparticles can be provided in stable oxidation states as complexes with monodentate, bidentate, tridentate, or tetradendate coordinating ligands such as for example iodide, bromide, sulfide, thiocyanate, chloride, nitrate, azide, acetate, fluoride, hydroxide, oxalate, water, isothiocyanate, acetonitrile, pyridine, ammonia, ethylenediamine, 2,2'-bipyridine, 1,10-phenanthroline, nitrite, triphenylphosphine, cyanide, or carbon monoxide. Various commercial sources can be used to obtain the metal salts or alkoxides. A non-limiting example of a commercial source of the above mentioned metals and metal oxides is Sigma Aldrich® (U.S.A.). $M^2$ and $M^3$ are preferably provided as inorganic or organic metal salts, especially water soluble metal salts such as halide salts, e.g., chlorides, bromides, iodides, fluorides; nitrates, nitrites, sulfates, etc. Organic metal salts may include acetates, carbonates, citrates, and the like. Preferably $M^2$ and $M^3$ are calcium and magnesium, and are preferably provided as the chloride salts thereof, e.g., calcium chloride ($CaCl_2$ and $MgCl_2$).

In step 2 of the method, the nanoparticles can be precipitated by reducing the pH of the aqueous solution, (for example, by introducing an acid into the aqueous solution). The acid can be an inorganic acid, an organic acid, or mixture thereof. Non-limiting examples of suitable mineral acids include hydrochloric, nitrous, nitric, sulfuric, phosphoric acid, boric acid, hydrobromic acid, perchloric acid, nitrous acid, hydroiodic acid, and the like. Non-limiting examples of organic acids include formic acid, acetic acid, propionic acid, butyric acid, valeric acid, caproic acid, oxalic acid, lactic acid, malic acid, citric acid, benzoic acid, carbonic acid, trifluormethanesulfonic acid, carboxylic acid and polycarboxylic acids with various functional groups including phosphonate, sulfonate and the like.

In an alternative embodiment, the precipitation step can be performed by reducing the amount of alkoxide (e.g., butoxide and some water) in the aqueous solution. Reduction in the amount of alkoxide can precipitate the nanoparticles from the solution. Removal of the alkoxide can be done using known removal/concentration methods, for example, evaporation at atmospheric or reduced pressure until nanoparticles are formed in the aqueous solution. In some embodiments, the alkoxide can be removed at a temperature of from 60° C. to 105° C., more preferably from 70° C. to 100° C., or 60° C., 65° C., 70° C., 75° C., 80° C., 85° C., 90° C., 95° C., 100° C., 105° C. or any value or range there between at atmospheric pressure. In some embodiments, the alkoxide is evaporated at a temperature of 70° C. at atmospheric pressure. The precipitation step can for about a period of from for 0.1 hours to 48 hours, more preferably from about 1 hour to about 24 hours, most preferably from about 1.5 to about 10 hours.

In step 3, the subterranean treatment additive can be loaded onto the nanoparticle using known impregnation and/or coating methods. By way of example, the subterranean treatment additive can be mixed with the nanoparticle to form a mixture. The mixture can be agitated (e.g., sonicated) to form a nanoparticle having the subterranean treatment additive loaded therein or thereon. In a preferred aspect of the invention, the nanoparticle can contain at least 0.1 to 70 wt. % or 80 wt. %, or 0.1 wt. %, 0.5 wt. %, 1 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. % of the well treatment additive. Without wishing to be bound by theory, it is believed that the subterranean well treatment additive can be chemical bound to the nanoparticle through an ionic bond, a covalent bond, a hydrogen bond, a Van der Walls interaction or by absorption or adsorption onto the particle. In some embodiments, the additive is loaded into the interstices of the lattice structure. In some embodiments, the nanoparticles can be separated from the anions of the salt precursor material (e.g., $Cl^-$).

The additive is capable of being released from the nanoparticle in a controlled manner over an extended period of time, e.g., for at least 10 days, 1 month, 6 months, 1 year, 5 years, 10 years or 10 years. In particularly preferred embodiments, at least some of the additive is released for at least 2000 days after application.

C. Subterranean Well Treatment Compositions

The loaded nanoparticles of the present invention can be provided to a treatment site as individual nanoparticles or as a subterranean treatment composition (e.g., a subterranean well treatment composition). By way of example, a subterranean well treatment composition can include a fluid (e.g., an aqueous liquid) that contains a plurality of loaded nanoparticles (e.g., a slurry). The composition can be a controlled-release composition capable of releasing the subterranean treatment additive over an extended period of time. These compositions can be prepared by admixing the loaded nanoparticles of the invention with a fluid that will be injected into the well. Non-limiting examples of a subterranean treatment composition fluid include water, salt water (KCl) an acidic aqueous solution, low sulfate seawater, an aqueous sodium carbonate solution, a surfactant, or other flush fluid, or can be a nonaqueous fluid (e.g., based on oil, natural gas or petroleum based fluids), or can be a combination of nonaqueous and aqueous fluids.

D. Methods of Treating Subterranean Wells or Wellbores

The loaded nanoparticles or loaded nanoparticle composition can be delivered to the subterranean formation using a variety of methods, pumping, pressuring injection, or the like. In some embodiments, a squeeze or continuous treatment method is used. A method of treating a subterranean formation, well, or wellbore is depicted in FIG. 1. In addition to treating wells, the loaded nanoparticles can be used to deliver additives to the subterranean formation for other purposes (e.g., deliver mud additives to drilling fluids or enhanced oil recovery fluids, or the like). Wells 102 can intersect the subterranean formation, and can be injection wells, production wells, water wells, or the like. As shown, the wells 102 intersect as vertical wells, but can be horizontal wells. Wells 102 can be uncased wellbores, cased wellbores or the like. In method 100, prior to production from well 102, the loaded nanoparticles or composition of the present invention can be injected into one or more wells 102, flow through the well and into subterranean formation 104 as shown by arrow 108. The loaded nanoparticles 110 can be deposited on rock formation 106 in the subterranean formation. Known drilling equipment (e.g., oil, gas, or water drilling equipment) can be used to inject the subterranean well treatment compositions into wells 102 (e.g., using a squeeze method, continuous method, or spear method). The nanoparticles can adsorb to the formation rock 106 and be the additive loaded on the nanoparticle can be returned to the well 102 in an amount effective to perform the necessary function (e.g., inhibit scale) when the well is put into production. As shown in the FIG. 1, fluid can flow over the rock as shown by arrow 112 and dissolve or desorb a small amount of treatment additive from the nanoparticle. The formation fluid containing the treatment additive then flows into the well. The treatment additive can coat or interact with the well materials or fluid in the well to treat the well (e.g., inhibit scale). By way of example, the treatment additive can be a scale inhibitor and contact of the formation fluid with the scale inhibitor dissolves or desorbs an effective amount of the scale inhibitor from the nanoparticle and carries the scale inhibitor into the well. The scale inhibitor can interact with the well material and/or fluids in the well to inhibit scale from forming on the inside portion of the wall of well 102. The composition of the nanoparticle and adherence of the additive to the nanoparticle allows an effective amount of additive to be released from the nanoparticle over an extended period of time (e.g., greater than 5 years).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Nanoparticle Preparation

Nanoparticles according to the present invention can be prepared using a precipitation method.

Magnesium chloride (0.18 g, $MgCl_2$, Sigma Aldrich® (U.S.A.)) and calcium chloride (0.18 g, $CaCl_2$, Sigma Aldrich) were dissolved in deionized water (180 mL) to form a 0.1 wt./vol. % by solution. The magnesium calcium chloride solution was heated to 90° C., and aluminum tri-sec-butoxide (25.4 g, $Al(sec-BuOH)_3$, Sigma Aldrich® (U.S.A.)) was added to above Mg/Ca salt solution to form a 3 wt. % Al/Mg/Ca colloid suspension. The Al/Mg/Ca colloid suspension was stirred for an hour at 90° C., and then any volatile by-products (e.g., residual alkoxide and salts thereof) were evaporated by stirring the solution in an open container for approximately 3 hours at 90° C.

The pH of the Al/Mg/Ca colloid solution was adjusted to 4 by addition of nitric acid (0.4436 mL, 70%, Fisher Scientific, (U.S.A)). At or around pH of 4, the aluminum/magnesium/calcium nanoparticles have a highly positively surface charge, which dispersed themselves in the slurry to form stable colloids. The slurry was allowed to cool to room temperature, and the sulfonated polycarboxylic acid (SPCA) scale inhibitor (5 g, Nalco Champion (U.S.A.) EC6157A) and deionized water (15 mL) was added to 40 mL of the 3 wt. % the slurry. The SPCA/nanoparticle slurry was sonicated for 1 minute with a sonicator that delivered 55 watts using 3371 joules over 1 minute to provide the loaded nanoparticles of the present invention (e.g., SPCA loaded $[Al_1Mg_{0.02}Ca_{0.02}]OOH$ nanoparticles).

Example 2

Nanoparticle Characterization

Size and Size Distribution.

Figure 2:
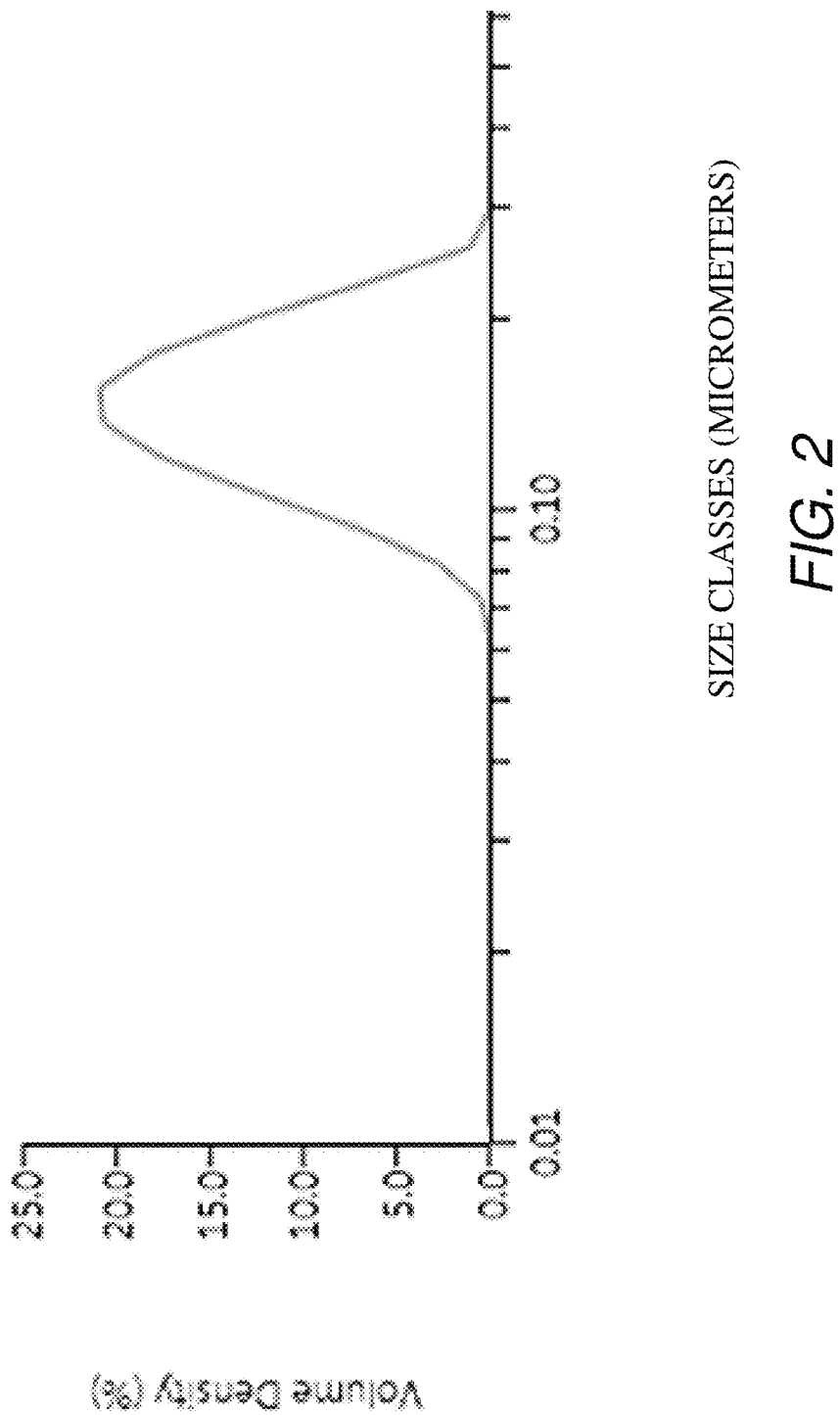
FIG. 2 is a graph of nanoparticle size in micrometers versus volume density in percent.
Figure 3:
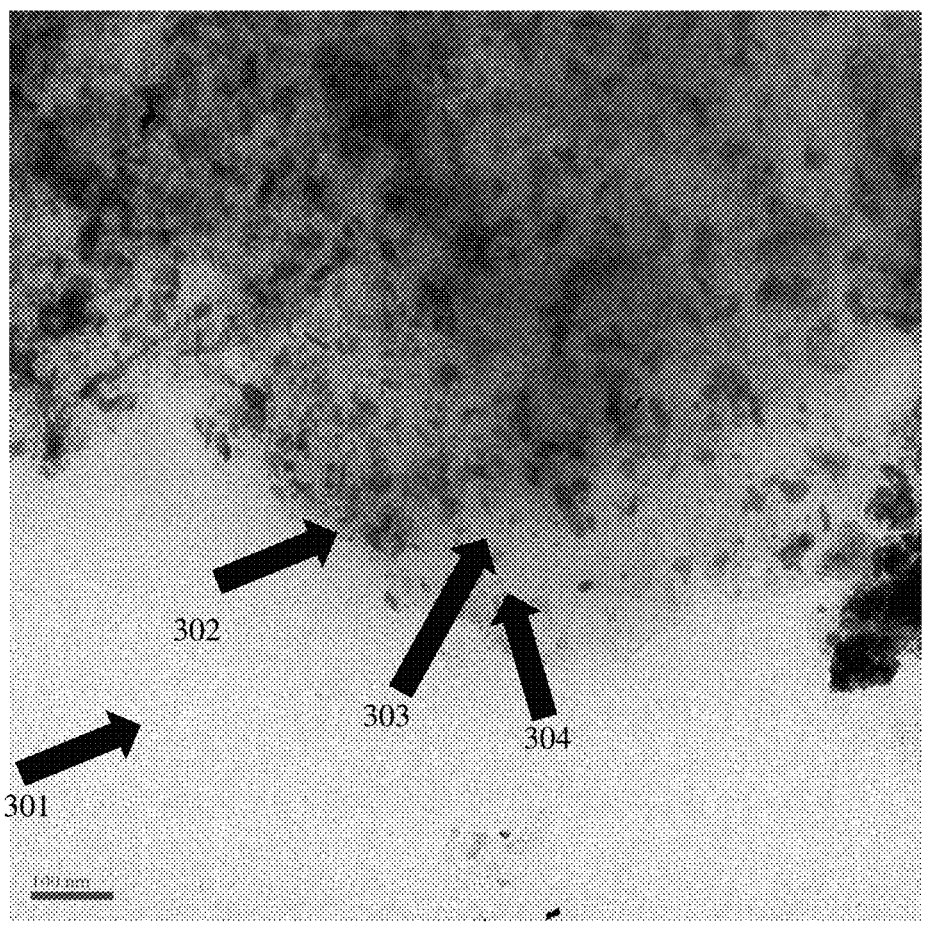
FIG. 3 depicts a transmission electron microscopy (TEM) image of the SPCA loaded nanoparticles at a 100 nm s

Nanoparticle size and size distribution were determined using a laser diffraction particle size analyzer (Malvern Mastersizer 3000) and by TEM imaging. Table 1 lists the size in μmeters and % volume density obtained through particle size analysis. FIG. 2 depicts a graph of the size classes in μm versus volume density in percent (%). FIG. 3 depicts a TEM image of the SPCA loaded nanoparticles at a 100 nm scale. Arrow 301 points to the light gray uniform background area formed from the carbon tape that was used as a holder for the loaded nanoparticles during TEM imaging. Arrow 302 points to a large aggregate of nanoparticles, arrow 303 points to a small aggregate of nanoparticles or single nanoparticle, and arrow 304 points to the SPCA polymer surrounding the nanoparticles (darker material than background, but lighter than the nanoparticles.

TABLE 1

| Size (μm) | % Volume Density |
| --- | --- |
| ≤0.06 | 0 |
| 0.068 | 0.27 |
| 0.077 | 2.14 |
| 0.09 | 5.76 |
| 0.01 | 10.38 |

TABLE 1-continued

| Size (μm) | % Volume Density |
| --- | --- |
| 0.11 | 14.75 |
| 0.13 | 17.50 |
| 0.15 | 17.67 |
| 0.17 | 15.08 |
| 0.19 | 10.51 |
| 0.21 | 5.48 |
| 0.24 | 0.46 |
| ≥0.28 | 0.00 |

X-Ray Diffraction (XRD) Analysis.

Figure 4A:
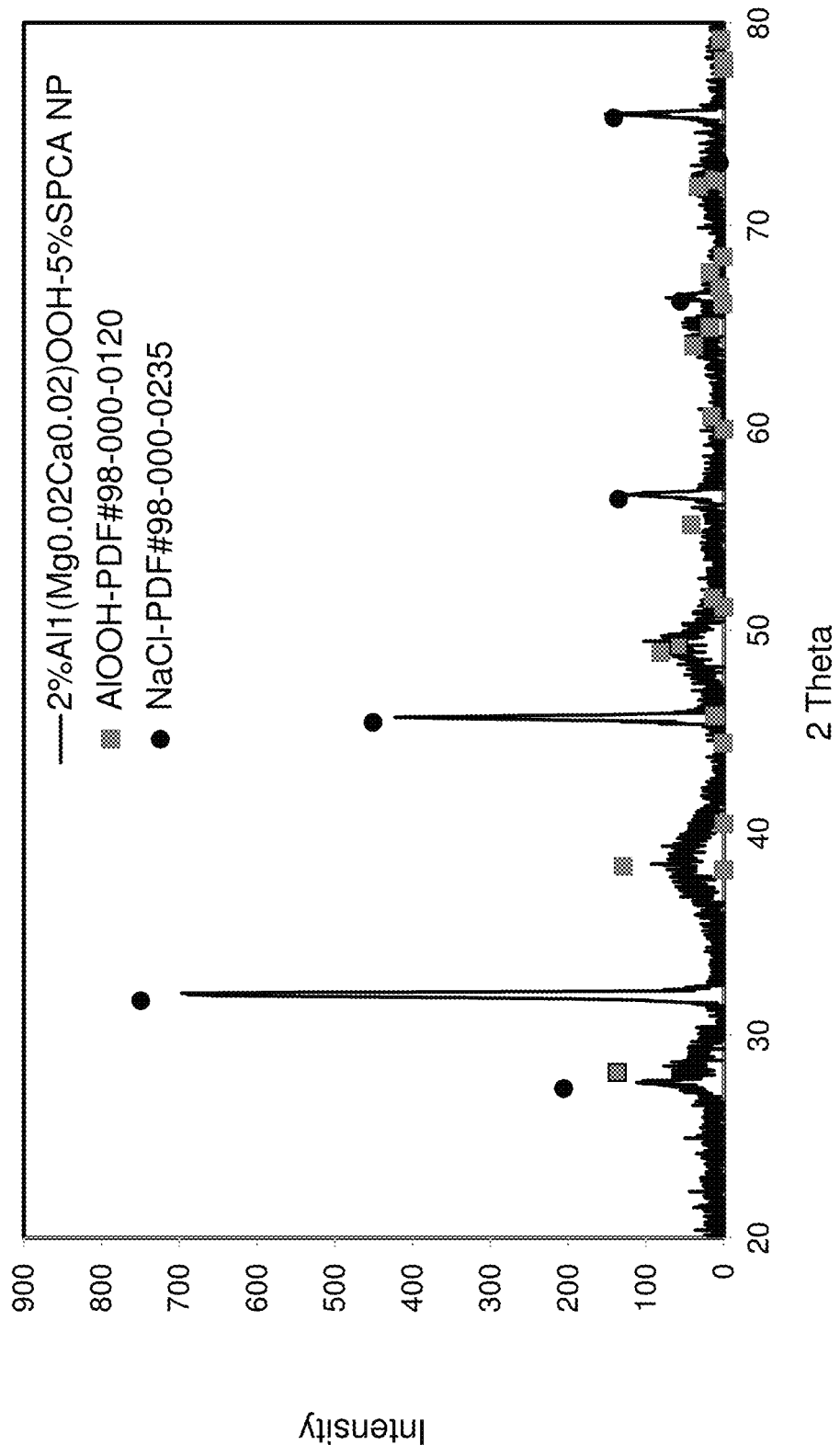
FIG. 4A shows XRD patterns for the $Al_1(Mg_{0.02}Ca_{0.02})$OOH with the AlOOH phase being identified by the square monikers and residual sodium chloride being identified by the circle monikers.
Figure 4B:
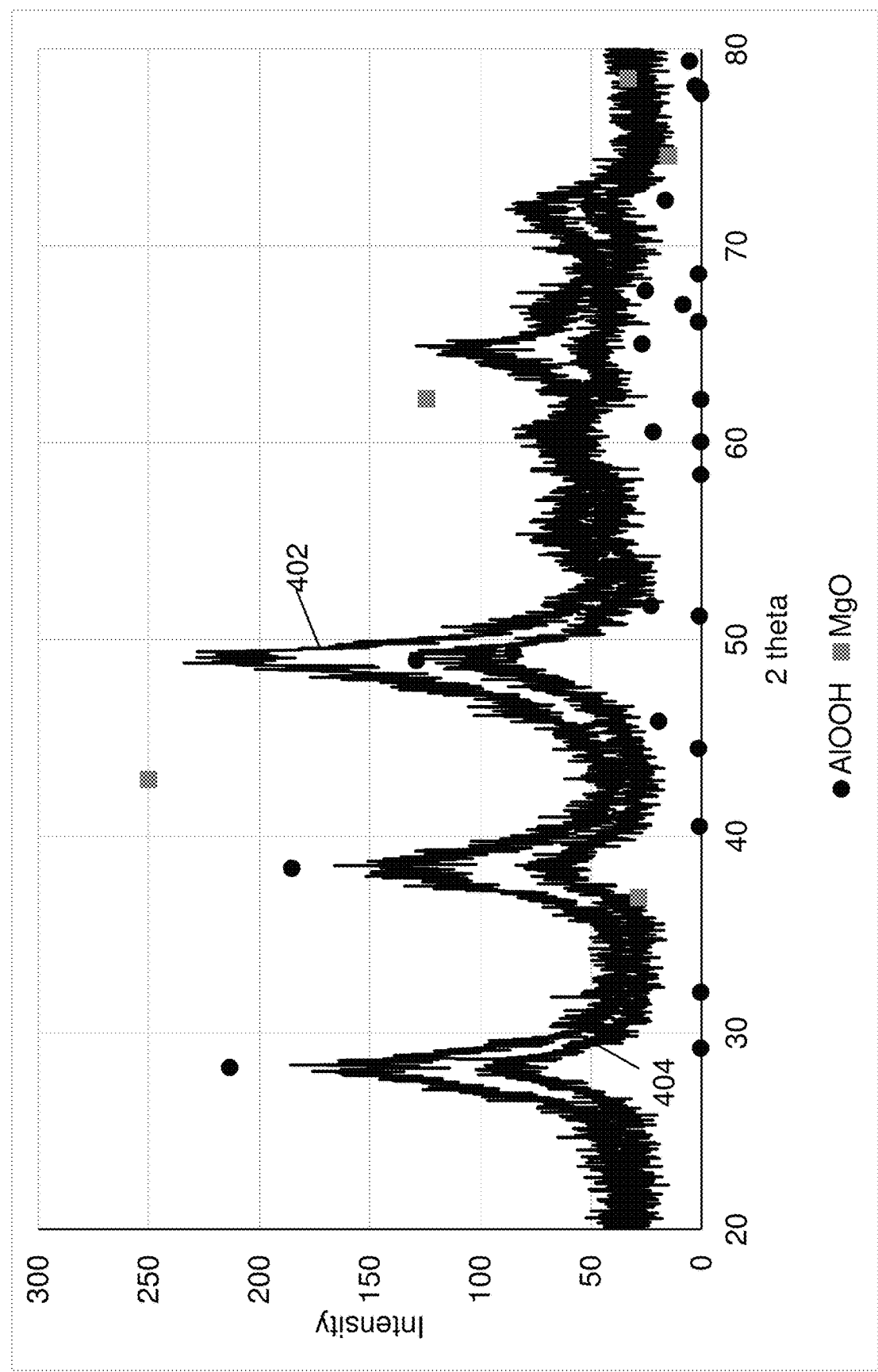
FIG. 4B shows XRD patterns for the $Al_1(Mg_{0.02}Ca_{0.02})$OOH nanoparticle and a comparative sample without Ca/Mg addition.
Figure 4C:
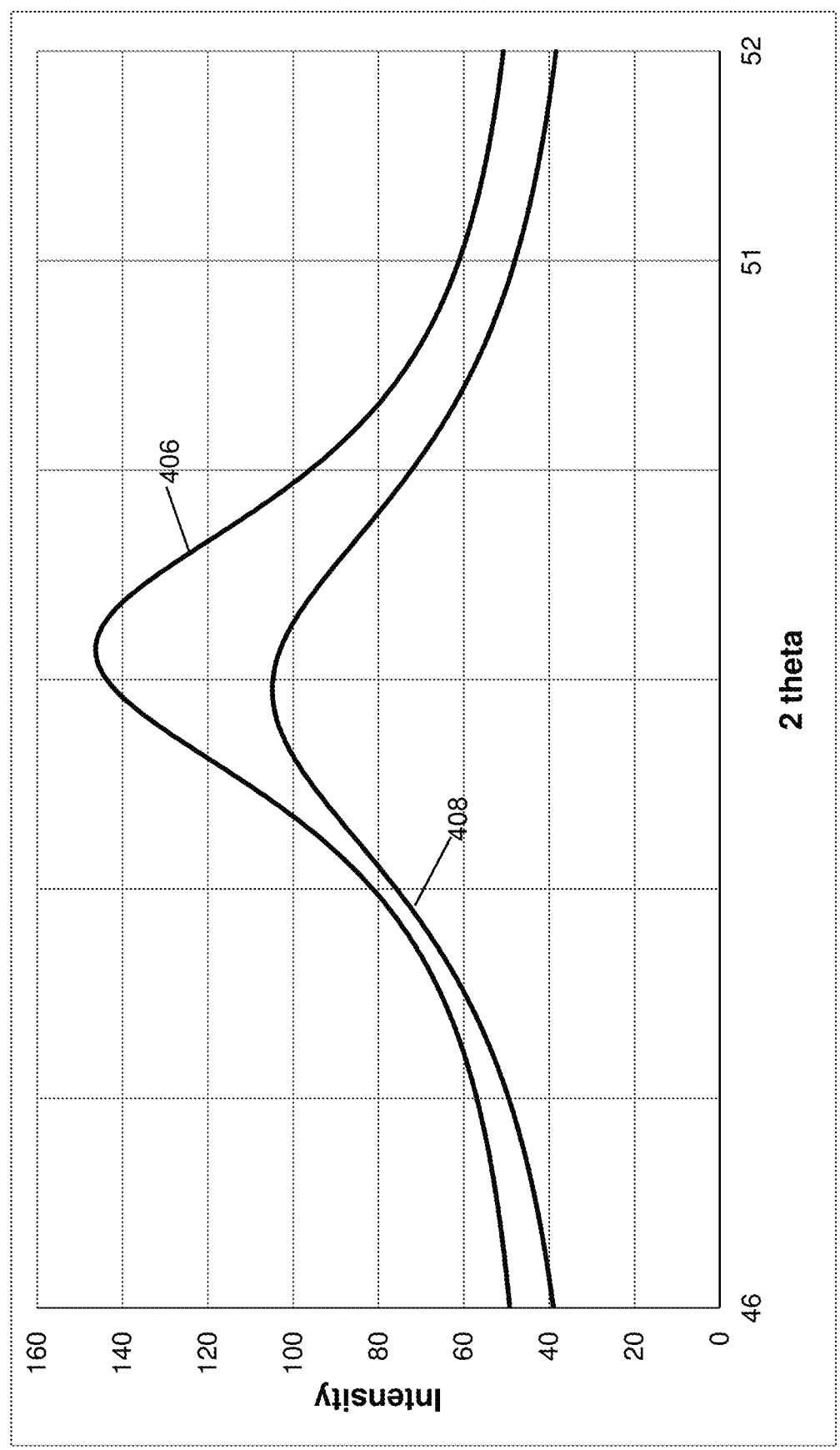
FIG. 4C is an XRD spectra curve fit data of FIG. 4B.

XRD analysis was performed using a Rigaku DMax, 6-sample holder instrument (Rigaku Corporation, USA) The nanoparticles from Example 1 were analyzed by X-ray diffraction methods. FIG. 4A shows XRD patterns for the $Al_1(Mg_{0.02}Ca_{0.02})OOH$ with the AlOOH phase being identified by the square monikers and residual sodium chloride being identified by the circle monikers. FIG. 4B show XRD patterns for a nanoparticle of the $Al_1(Mg_{0.02}Ca_{0.02})OOH$ nanoparticle of the present invention and a control sample absent Ca and Mg. Data line 402 is the sample of the present invention, data line 404 is the control sample, circles mark the peaks for AlOOH if present, and squares mark the peaks for MgO if present. As determined from the XRD no $Ca(OH)_2$ or $Mg(OH)_2$ phases were present in the nanoparticle, thereby providing evidence that the calcium and magnesium are part of the crystal structure. FIG. 4C is an XRD curve fit of FIG. 4B that depicts the curve shift of the inventive sample vs. the comparative sample. Data line 406 is the $Al_1(Mg_{0.02}Ca_{0.02})OOH$ nanoparticle of the present invention and data line 408 is the comparative sample. A peak shift of about 49 theta was observed due to the addition of Ca and Mg.

Energy Dispersive X-Ray Spectroscopy (EDX) Analysis.

EDX analysis was performed using a FEI Quanta 400 ESEM FEG (FEI part of Thermo Fisher Scientific, USA). The sample was made using the process of Example 1. From the EDX data it was determined that the sample has the quantities of oxygen, magnesium, aluminum and calcium listed in Table 2. The EDX analysis also showed no clustering of Mg that would be associated with a separate brucite phase ($MgO_{solid}$).

TABLE 2

| Component | Wt. % |
| --- | --- |
| Oxygen | 41% |
| Magnesium | 2% |
| Aluminum | 57% |
| Calcium | 1% |

Scanning Electron Microscopy (SEM) Analysis.

Figure 5:
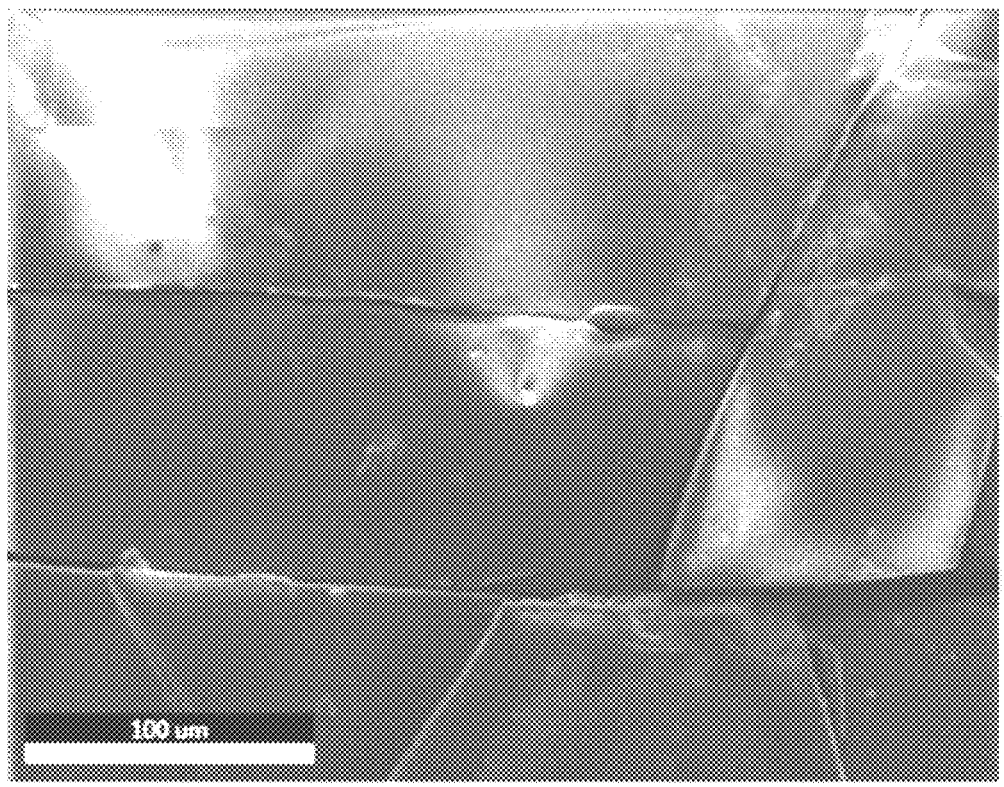
FIG. 5 is a scanning electron image of the $Al_1(Mg_{0.02}Ca_{0.02})$OOH nanoparticle of the present invention.

SEM analysis was performed using a FEI Quanta 400 ESEM FEG. The sample was made using the process of Example 1. FIG. 5 depicts a SEM image of a layer of the dried CaMg nanoparticle. From the EDX data it was determined that the sample has the quantities of oxygen, magnesium, aluminum and calcium listed in Table 2.

Thermodynamic Analysis.

Thermodynamic analysis was done to show no oxides were present in the nanoparticle. Initially, aluminum tris (sec-butoxide), $Al(OBu)_3$, is added to 90° C. hot water to a final concentration of 0.56 M. As $Al(OBu)_3$ reacts, the pH increases to around 9 pH. The overall reaction is:

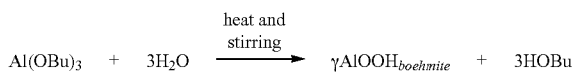

Some butanol was lost to the atmosphere, during synthesis. Without wishing to be bound by theory it is believed that the hydrolysis should have little effect on the pH, but probably due to slow kinetics as one, two, and then three of the aluminum butoxide bonds are hydrolyzed there may be an intermediate increase in solution pH. The observed pH value increased to around 9 pH at 90° C. Then calcium and magnesium chloride were added along with concentrated nitric acid until the final pH was about 4 pH. Then the sample was heated for two more hours at 4 pH. Nearly all of the aluminum precipitated as $\gamma AlOOH_{boehmite}$ solid, as confirmed by XRD. Furthermore, $\gamma AlOOH_{boehmite}$ will remain virtually insoluble to below 4 pH.

Figure 6:
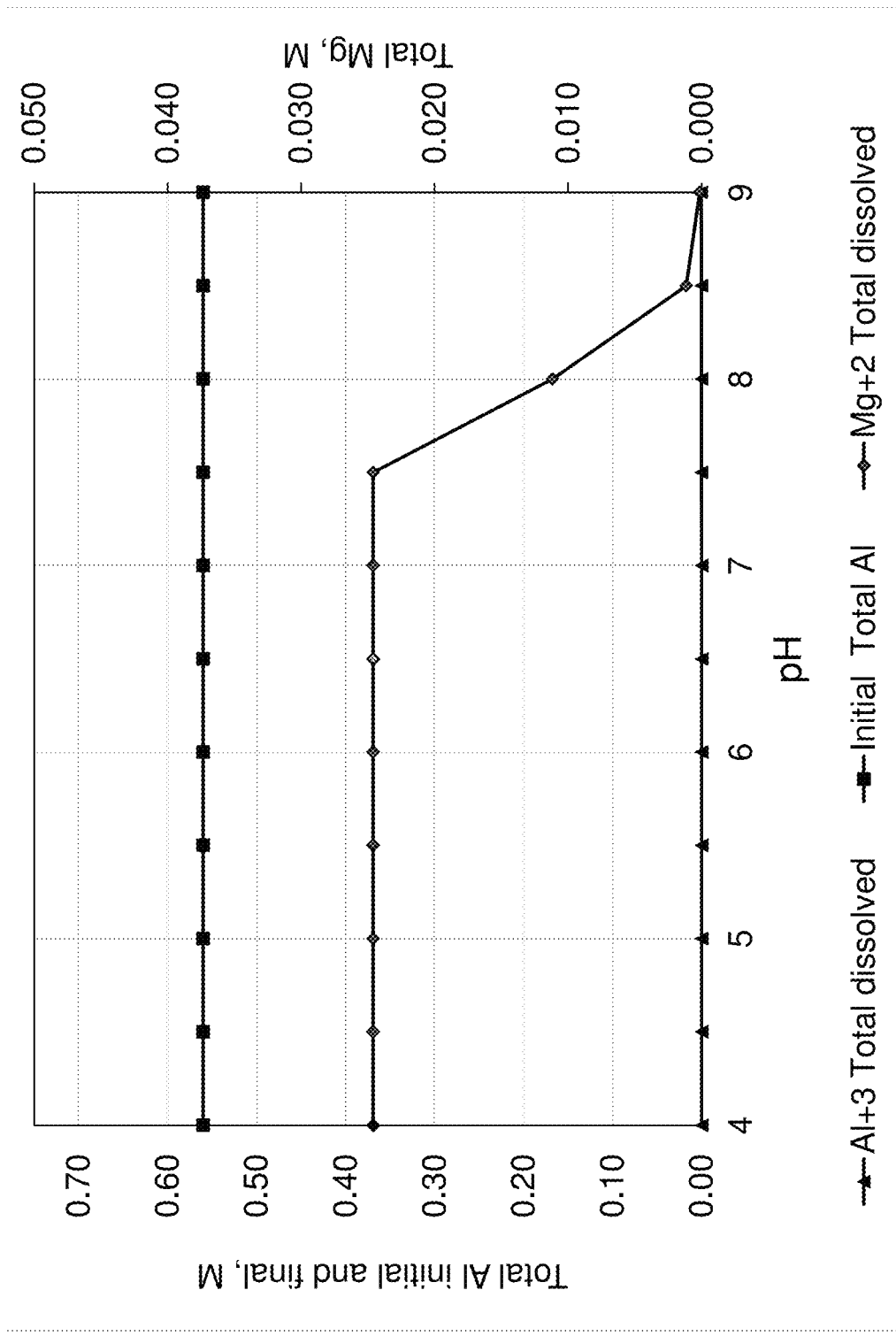
FIG. 6 is are plots of initial and final Total Al concentration (M) vs. pH, assuming boehmite as possible precipitation and total Mg vs. pH, assuming brucite as possible precipitation at 90° C.

FIG. 6 is a plot of a simulation of boehmite and brucite ($MgO_{solid}$) solubility vs. pH from 9 to 4 pH at 90° C., done using Visual Minteq 3.0 software (KTH, Sweden). FIG. 6 shows plots of initial and final Total Al concentration (M) vs. pH, assuming boehmite as possible precipitation, and total Mg vs. pH, assuming brucite as possible precipitation at 90° C. From the simulation, it was determined that brucite can precipitate from about 7.5 to 9 pH, but as the pH was lowered to below approximately 7.5 pH, it dissolved. Thus, it was determined that at the reaction conditions of 4 pH and 90° C. for two hours there is no reasonable possibility for brucite to remain in the solid phase. The absence of brucite was also confirmed by EDX analysis showing no concentrations/clustering of Mg, that would be associated with a separate brucite phase, rather the Mg was uniformly distributed in the solid phase. This material has been used with SPCA and shows enhanced performance over the product without Mg in the solid.

Example 3

Release Performance of Scale Inhibitor

Figure 7:
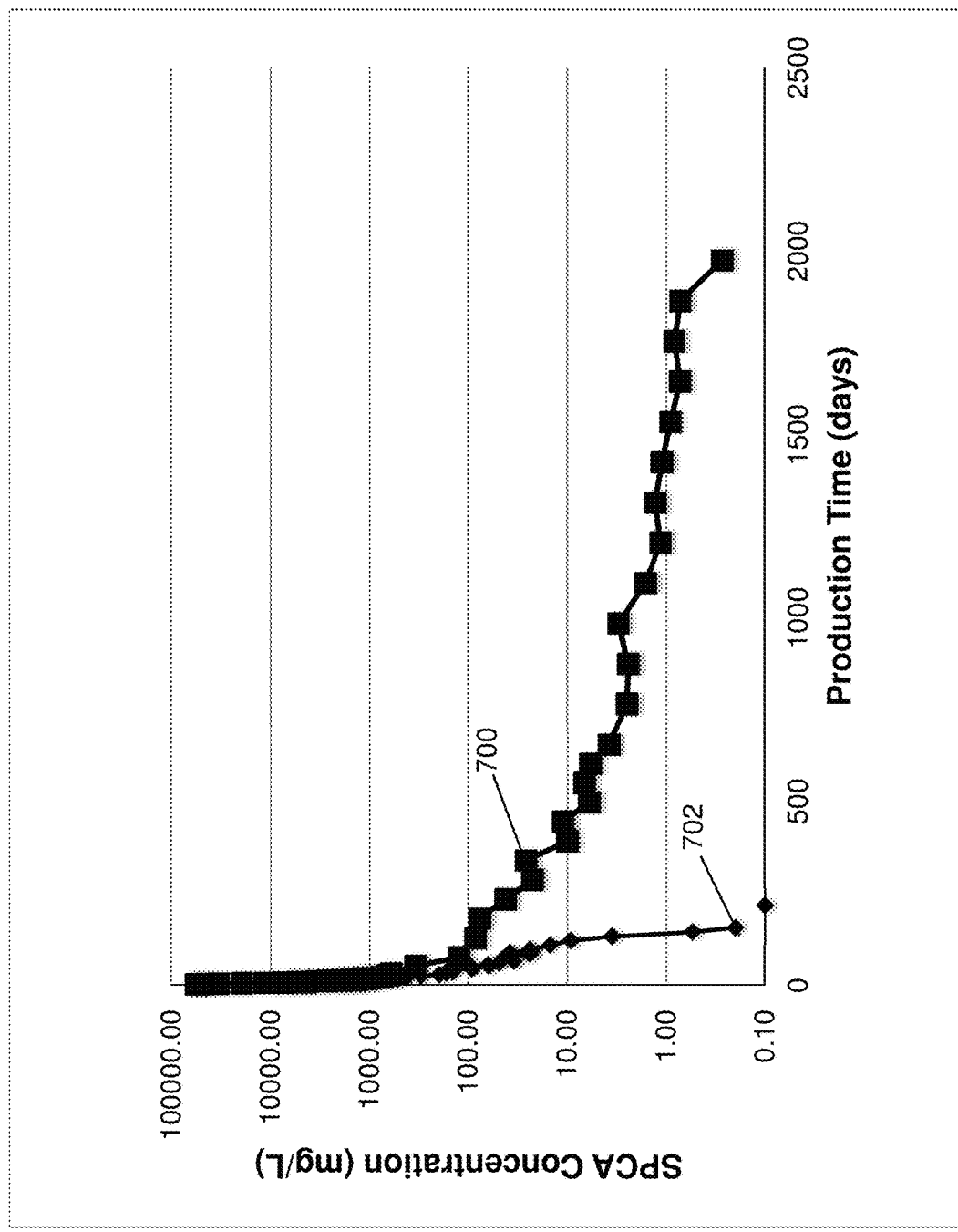
FIG. 7 depicts graphs of production time in days versus SPCA concentration in mg/L in produced water for SPCA alone and loaded nanoparticles of the present invention.

Release performance was measured in reservoir material by injecting the nanoparticles from Example 1 or a comparative sample (SPCA alone ("SPCA")) into the core material and then flowing simulated produced water back through the same reservoir material. The release rate was determined by the concentration of the loaded nanoparticles of the present invention or SPCA over time. FIG. 7 depicts a graph of SPCA and the loaded nanoparticles of the present invention concentration returns as translated to production days. Data line 700 is the loaded nanoparticles of the present invention and data line 702 is SPCA. From the data, it was determined that the loaded nanoparticles of the present invention provided controllable release of the additive over an extended period of time that was at least 5 times longer than the conventional additive.

The invention claimed is:

1. A nanoparticle having a formula of:

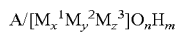

where
M$^1$, M$^2$, and M$^3$ are in the crystal lattice structure of the nanoparticle and M$^1$ is a Column 13 element selected from the group consisting of aluminum (Al), gallium (Ga), indium (In), and thallium (Tl), M$^2$ and M$^3$ are each a Column 2 metal, a Column 14 metal, or a transition metal, with the proviso that M$^2$ and M$^3$ are different, x is 0.03 to 3, y is 0.01 to 0.4, z is 0.01 to 0.4 and n and m are determined by the oxidation states of the metals M$_1$, M$_2$, and M$_3$, and A is a well treatment additive capable of being released from the nanoparticle.

2. The nanoparticle of claim 1, wherein M$_2$ and M$_3$ are each independently beryllium (Be), magnesium (Mg), calcium (Ca), strontium (Sr), barium (Ba) and radium (Ra).

3. The nanoparticle of claim 1, wherein M$^1$ is Al, M$^2$ is Mg and M$^3$ is calcium (Ca).

4. The nanoparticle of claim 1, wherein A is a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof.

5. The nanoparticle of claim 4, wherein the additive is a scale inhibitor.

6. The nanoparticle of claim 5, wherein the scale inhibitor is an organic molecule having a carboxylic acid, a polycarboxylic acid, aspartic acid, maleic acid, sulfonic acid, phosphonic acid, or a phosphate ester group or salts thereof.

7. The nanoparticle of claim 6, wherein the scale inhibitor is a polymer comprising sulfonated polycarboxylic acid functionality.

8. The nanoparticle of claim 1, wherein the well treatment additive is impregnated within the nanoparticle.

9. The nanoparticle of claim 1, wherein the well treatment additive is chemically bound to the nanoparticle through an ionic bond, a covalent bond, a hydrogen bond, a Van der Walls interaction, or by adsorption onto the particle.

10. The nanoparticle of claim 1, having a diameter of 1 nm to 10,000 nm.

11. The nanoparticle of claim 10, wherein the diameter is 10 nm to 1000 nm.

12. The nanoparticle of claim 10, wherein the diameter is 10 nm to 200 nm.

13. The nanoparticle of claim 1, wherein the additive is capable of being released from the nanoparticle in a controlled manner over an extended period of time.

14. A well treatment composition comprising a plurality of the nanoparticles of claim 1.

15. The well treatment composition of claim 14, wherein the composition is a fluid.

16. The well treatment composition of claim 14, wherein the well-treatment composition is a controlled-release composition capable of releasing the well treatment additive over an extended period of time.

17. The well treatment composition of claim 14, further comprising water, salt water, an acidic aqueous solution, low sulfate seawater, an aqueous sodium carbonate solution, a surfactant, or other flush fluid, or any combination thereof.

18. The well treatment composition of claim 14, wherein M$_2$ and M$_3$ are each independently beryllium (Be), magnesium (Mg), calcium (Ca), strontium (Sr), barium (Ba) and radium (Ra).

19. The well treatment composition of claim 14, wherein M$^1$ is Al, M$^2$ is Mg and M$^3$ is calcium (Ca).

20. The well treatment composition of claim 14, wherein A is a scale inhibitor, a hydrate inhibitor, a clay stabilizer, a bactericide, a salt substitute, a relative permeability modifier, a sulfide scavenger, a corrosion inhibitor, a corrosion inhibitor intensifier, a pH control additive, a surfactant, a breaker, a fluid loss control additive, an asphaltene inhibitor, a paraffin inhibitor, a chelating agent, a foamer, a defoamer, an emulsifier, a demulsifier, an iron control agent, a solvent, a friction reducer, or any combination thereof.

\* \* \* \* \*